United States Patent
Robinton (10) Patent No.: US 10,820,203 B2
(45) Date of Patent: Oct. 27, 2020

(54) METHOD, APPARATUS, AND SYSTEM FOR MOBILE PROVISIONING OF NFC CREDENTIALS

(71) Applicant: ASSA ABLOY AB, Stockholm (SE)

(72) Inventor: Mark Robinton, Eden Prairie, MN (US)

(73) Assignee: ASSA ABLOY AB, Stockholm (SE)

(*) Notice: Subject to any disclaimer, the term of this patent is extended or adjusted under 35 U.S.C. 154(b) by 717 days.

(21) Appl. No.: 14/785,653

(22) PCT Filed: Apr. 18, 2014

(86) PCT No.: PCT/IB2014/001706
§ 371 (c)(1),
(2) Date: Oct. 20, 2015

(87) PCT Pub. No.: WO2014/184678
PCT Pub. Date: Nov. 20, 2014

(65) Prior Publication Data
US 2016/0080343 A1    Mar. 17, 2016

Related U.S. Application Data

(60) Provisional application No. 61/817,577, filed on Apr. 30, 2013.

(51) Int. Cl.
*H04L 29/06* (2006.01)
*H04W 12/08* (2009.01)
(Continued)

(52) U.S. Cl.
CPC .......... *H04W 12/08* (2013.01); *H04L 63/08* (2013.01); *H04L 63/10* (2013.01); *H04W 4/80* (2018.02); *H04W 12/04031* (2019.01)

(58) Field of Classification Search
CPC ...... H04W 4/008; H04W 12/08; H04L 63/10; H04L 63/08
See application file for complete search history.

(56) References Cited

U.S. PATENT DOCUMENTS

2009/0036126 A1  2/2009  Morikuni et al.
2011/0014898 A1  1/2011  Doyle
2014/0068719 A1*  3/2014  Kiukkonen ........... H04W 12/08
                                                 726/4

FOREIGN PATENT DOCUMENTS

WO    WO 2012/052806    4/2012
WO    WO 2012/130727    10/2012

OTHER PUBLICATIONS

International Search Report and Written Opinion for International (PCT) Patent Application No. PCT/IB2014/001706, dated Nov. 27, 2014 9 pages.

(Continued)

*Primary Examiner* — Brandon S Hoffman
*Assistant Examiner* — Nega Woldemariam
(74) *Attorney, Agent, or Firm* — Schwegman Lundberg & Woessner, P.A.

(57) ABSTRACT

A mobile provisioning system, method, and apparatus are provided. The mobile provisioning method is disclosed to enable a first mobile device to provision or write one or more guest identification objects to a second mobile device. The guest identification objects may be written only if the first mobile device has the appropriate permissions and may further be limited in their use as compared to non-guest identification objects.

15 Claims, 4 Drawing Sheets

(51) Int. Cl.
*H04W 4/80* (2018.01)
*H04W 12/04* (2009.01)

(56) References Cited

OTHER PUBLICATIONS

International Preliminary Report on Patentability for Intenational (PCT) Patent Application No. PCT/IB2014/001706, dated Nov. 12, 2015 6 pages.
Official Action for European Patent Application No. 14766533.5, dated Jun. 28, 2017 5 pages.
Official Action for European Patent Application No. 14766533.5, dated May 23, 2018 5 pages.

* cited by examiner

METHOD, APPARATUS, AND SYSTEM FOR MOBILE PROVISIONING OF NFC CREDENTIALS

CROSS REFERENCE TO RELATED APPLICATIONS

This application is a national stage application under 35 U.S.C. 371 of PCT Application No. PCT/IB2014/001706 having an international filing date of Apr. 18, 2014, which designated the United States, which PCT application claimed the benefit of U.S. Application Ser. No. 61/817,577, filed Apr. 30, 2013, both of which are incorporated by reference in their entirety.

FIELD OF THE DISCLOSURE

The present disclosure is generally directed toward creating and managing trusted data.

BACKGROUND

One type of identification technology employs Near Field Communications (NFC). NFC is a set of short-range wireless communication technologies that have devices operate at approximately 13.56 MHz and at rates ranging from 106 kbit/s to 848 kbit/s. NFC standards cover communications protocols and data exchange formats, and are based on existing radio-frequency identification (RFID) standards including ISO/IEC 14443 and FeliCa, each of which are hereby incorporated herein by reference in their entirety. The standards include ISO/IEC 18092, which is also incorporated herein by reference in its entirety, and those defined by the NFC Forum.

Another type of technology currently gaining traction and emerging as a viable alternative to NFC is newer versions of the Bluetooth standard (e.g., Bluetooth 4), the entire contents of which are hereby incorporated herein by reference. Bluetooth is a proprietary open wireless technology standard for exchanging data over short distances (using short-wavelength radio transmissions in the ISM band from 2400-2480 MHz) from fixed and mobile devices, creating personal area networks (PANs) with high levels of security. The primary difference between NFC technologies and Bluetooth technologies is that Bluetooth relies on powered devices for both sides of the communication whereas NFC can facilitate communications between a powered device and a passive device (e.g., an NFC tag or credential). In other words, under NFC standards, one device can operate without an internal power source, such as a battery.

There are currently three NFC operating modes defined by the NFC Forum: (1) Card Emulation Mode; (2) Reader/Writer Mode; and (3) Peer-to-Peer Mode. In the Card Emulation Mode, an NFC-enabled phone emulates a contactless card in accordance with ISO 14443 and/or ISO 15693, each of which is hereby incorporated herein by reference in their entirety. Typical applications of the Card Emulation Mode include payment, ticketing, and access control applications.

In the Reader/Writer Mode, the NFC-enabled phone reads a tag and typically performs some function based on the information obtained from the read tag. Typical applications of the Reader/Writer Mode include reading posters with an NFC tag in proximity thereto, interactive advertising, launching mobile Internet (e.g., automated web-browser activation), automated Short Message Service (SMS), and automated call initiation.

In the Peer-to-Peer Mode, two NFC-enabled phones, or similar types of devices, are allowed to exchange data with one another. Typical applications of the Peer-to-Peer Mode include setting up wireless settings (e.g., Bluetooth, Wi-Fi, etc.), sharing business cards, or sharing information between NFC-enabled phones.

In most transactions, NFC involves an initiator and a target. The initiator actively generates a Radio Frequency (RF) field that can power a passive target. The NFC protocol enables communications between readers and relatively simple devices such as tags, key fobs, cards, etc., which do not necessarily require batteries.

As with proximity card technologies, NFC is mediated by magnetic induction between two loop antennas located within one another's near field, effectively forming an air-core transformer.

The applications for NFC technology are numerous. In particular, as discussed above, NFC can be implemented in mobile ticketing applications (e.g., extension of secure access system utilizing contactless cards, airline tickets, concert/event tickets, etc.), electronic keys (e.g., as a replacement for car keys, house keys, office keys, hotel room keys, etc.), mobile payment, intelligent advertising, Bluetooth pairing, and so on.

SUMMARY

It is one aspect of the present disclosure to provide the ability to leverage NFC and/or Bluetooth technologies to create and manage trusted relationships and trusted objects. Although embodiments of the present disclosure will be primarily discussed in connection with NFC technologies, it should be appreciated that alternatives to NFC technologies can be used without departing from the scope of the present disclosure. For example, Bluetooth 4, other variants of the Bluetooth standard, and/or other comparable medium-to-short-range communication protocols can be employed to create, share, and/or manage trusted relationships and credentials.

In particular, it is an aspect of the present disclosure to leverage NFC and/or Bluetooth technologies to distribute access credentials. In some embodiments, a trusted mobile device is used as a mechanism for requesting a guest credential on behalf of a visitor or untrusted mobile device and then transferring the guest credential to the visitor mobile device when such a guest credential is received at the trusted mobile device. In some embodiments, the trusted mobile device may operate in a transparent writing mode to provide the guest credential to the visitor mobile device. While the transparent writing mode is but one type of NFC mechanism that can be used to communicate a guest credential from the trusted mobile device to the visitor mobile device, it should be appreciated that other mechanisms for transferring the guest credential to the visitor mobile device can be used without departing from the scope of the present disclosure.

In another aspect of the disclosure, a first mobile device (e.g., a trusted mobile device) receives trusted identity platform (TIP) information by some connection or communication between the first mobile device and a credential issuer. The TIP information may then be exchanged or provided from the first mobile device to a second mobile device, such as a visitor mobile device. In this way, the first mobile device behaves as a conduit by which the credential issuer can distribute TIP information to the second mobile device. The TIP information may include, in some embodiments, a guest access pass, guest credential, a secret, an encryption key, and/or other access control authorizations. The second mobile device may then use the TIP information to access one or more secured logical or physical assets in an access control system. Thus, a visitor operating the second mobile device can receive guest credentials without having to visit a physical security office or other dedicated location to receive a guest credential. Instead, the visitor can receive the guest credential from the first mobile device based on the first mobile device's trusted relationship with the credential issuer. In this way, the first mobile device is capable of provisioning the second mobile device with a guest credential. The same or similar process can be used to share a residential key, a password to an account, or other information used to access physical and/or logical assets.

It is another aspect of the present disclosure to provide a mobile device that is configured to provision other mobile devices. The mobile device may include a mobile device interface that is capable of communicating with another mobile device, such as a visitor mobile device, to enable the mobile device to receive at least some information describing the visitor mobile device. In some embodiments, the information describing the visitor mobile device may include any information that identifies (e.g., uniquely identifying) the visitor mobile device, a user of the visitor mobile device, or some other property of the visitor mobile device. The mobile device may further include a credential request unit that is configured to issue a request for one or more guest credentials to a credential issuer on behalf of the visitor mobile device, the request containing the at least some information describing the visitor mobile device.

A credential issuer is also disclosed. The credential issuer may be configured to receive a request for a guest credential, the request being received from a trusted mobile device, and then determine whether to generate and provide a guest credential for a visitor mobile device. In some embodiments, the credential issuer is configured to analyze information from the trusted mobile device to determine whether or not to generate a guest credential for the visitor mobile device. If the credential issuer determines to generate a guest credential for the visitor mobile device, then the guest credential may be generated and sent to the visitor mobile device via the trusted mobile device.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

In particular, while embodiments of the present disclosure will present concepts related to mobile devices communicating credentials via NFC, it should be appreciated that the claims are not so limited. Rather, guest credentials can be requested and distributed using any type of known or yet-to-be-developed protocol or combination of protocols.

Figure 1:
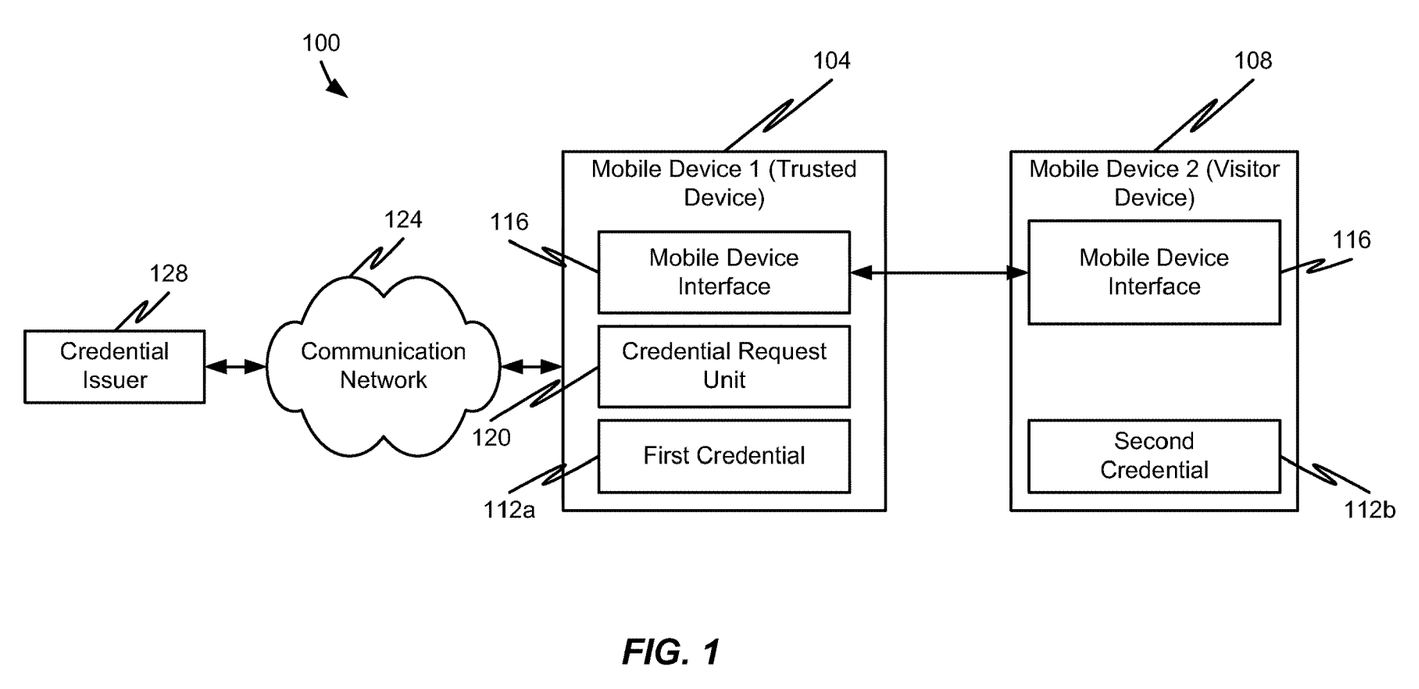
FIG. 1 is a block diagram depicting an embodiment of a trusted communication system.

FIG. 1 depicts a communication system 100 in accordance with embodiments of the present disclosure. The communication system 100 may include a first mobile device 104 and a second mobile device 108 that are capable of exchanging information between one another. In some embodiments, the first mobile device 104 corresponds to a trusted mobile device 104 whereas the second mobile device corresponds to a visitor or untrusted mobile device 108. The first mobile device 104 may be considered "trusted" by virtue of a trusted or pre-established relationship that exists between the trusted mobile device 104 and a credential issuer 128. More specifically, a single entity may be responsible for administering and controlling the trusted mobile device 104 and the credential issuer 128, which means that the single entity has some level of control over the trusted mobile device 104.

As a non-limiting example, the trusted mobile device 104 may correspond to a mobile communication device (e.g., cellular phone) owned by an enterprise that also administers the credential issuer 128. As another non-limiting example, the trusted mobile device 104 may belong to an employee of an enterprise that administers the credential issuer 128. In this example, the trusted mobile device 104 may be considered trusted because the employee has registered their mobile device with the enterprise and the credential issuer 128 knows the identity of the trusted mobile device 104.

In some embodiments, one or both mobile devices 104, 108 may be configured to exchange communications with other communication devices via a communication network 124. In some embodiments, the mobile devices 104, 108 are configured to exchange communications with other communication devices using one or more communication protocols known to the devices and supported by the communication network.

The communication network 124 may be embodied as any type of distributed set of communication/processing devices. As some non-limiting examples, the communication network 124 may comprise a cellular communication network (e.g., a Global System for Mobile communication (GSM) network, 3G network, 4G network, a Digital Cellular System (DCS), and/or Personal Communications Systems (PCS)), a Local Area Network (LAN), multiple LANs, a Wide Area Network (WAN), an enhanced IP-based network, a circuit-switched network, a Session Initiation Protocol (SIP) network, the Internet, the Public Switched Telephone Network (PSTN), a Plain Old Telephone System (POTS) network, an Integrated Serviced Digital Network (ISDN), an IP Multimedia Subsystem (IMS) network, a Voice over IP (VoIP) network, or combinations thereof.

In addition to being configured to communication over a communication network 124, the mobile devices 104, 108 may also be configured to exchange direct communications. In particular, each mobile device 104, 108 may be provided with a mobile device interface 116 that enables direct communications between the mobile devices 104, 108. In some embodiments, the mobile device interface 116 allows the mobile devices 104, 108 to wirelessly exchange communications with one another as long as the devices 104, 108 are within a predetermined distance of one another. The predetermined distance may be defined by the protocol or technologies used by the mobile device interfaces 116. As an example, the mobile device interfaces 116 may correspond to NFC modules in each mobile device, in which case the mobile devices 104, 108 can be configured to exchange wireless communications with one another via NFC as long as the devices are close enough to support such communications (e.g., between approximately 0.01 m and 0.5 m). As another example, the mobile device interfaces 116 may facilitate Bluetooth communications between the mobile devices 104, 108, in which case the communication range may be between approximately 0.01 m and 2.0 m. Still other communication protocols that may be supported by the mobile device interfaces 116 include, without limitation, Wi-Fi (e.g., IEEE 802.11x, Zigbee, Wi-Max, etc.). While contactless communications between the mobile devices 104, 108 are primarily described herein, it should be appreciated that the mobile device interfaces 116 may support wired communications. For instance, the mobile device interfaces 116 may include Universal Serial Bus (USB) ports and the mobile devices 104, 108 can be connected via a USB cable.

The mobile devices 104, 108 may correspond to any type of communication device such as a telephone, a mobile telephone, a cellular phone, a Personal Digital Assistant (PDA), a tablet, a thin client computing device, a netbook, a watch, a key fob, a portable card-shaped credential, or the like. As shown in FIG. 1, the trusted mobile device 104 may communicate with the credential issuer 128 via the communication network 124 using any one or combination of protocols supported by the communication network 124. In particular, the mobile device 104 may exchange communications with the credential issuer 128 via one or more of a Short Message Service (SMS) message, a Multimedia Message Service (MMS) message, or one or more packets transmitted via the TCP/IP suite of communication protocols (e.g., via email, a File Transfer Protocol (FTP) exchange, a Hyper Text Transfer Protocol (HTTP) exchange, or the like). In other embodiments, the communication network 124 may correspond to an enterprise network, an access control network, or the like. The communication network 124 may include one or more of an RS-232 network, an RS-485, and/or an RS-422 network.

The trusted mobile device 104 may further include a credential request unit 120 that enables the trusted mobile device 104 to communicate with the credential issuer 128. In some embodiments, the credential request unit 120 includes the functionality that enables the trusted mobile device 104 to generate a request for a guest credential on behalf of the visitor mobile device 108, transmit the request for a guest credential to the credential issuer 128. The credential request unit 120 may also be configured to format the request for the guest credential such that the credential issuer 128 knows the request is coming from the trusted mobile device 104 instead of an untrusted device. In other words, the credential request unit 120 may be configured to authenticate the trusted device 104 to the credential issuer 128. In some embodiments, the authentication information for the trusted mobile device 104 is provided in the request for a guest credential (e.g., embedded in the request). In some embodiments, the authentication information for the trusted mobile device 104 is provided in a communication transmitted separate from the request for a guest credential, which may occur before or after the request for the guest credential is transmitted.

It should be noted that if the trusted mobile device 104 need be a communication device (able to communicate with the credential issuer 128) and comprising high computing means (capable to the credential request unit), the visitor mobile device 108 could be a simple smart card. The only limitation is that it should comprise a mobile device interface compatible with at least one of the ones of the trusted mobile device 104.

In some embodiments, the trusted mobile device 104 may have a first credential 112a maintained thereon (e.g., stored in memory of the trusted mobile device 104). The credential request unit 120 may utilize some or all of the first credential 112a to authenticate the trusted mobile device 104 to the credential issuer 128. The first credential 112a may be solely used for generating requests for guest credentials. In other embodiments, the first credential 112a may also be used by the trusted mobile device 104 to access one or more assets in an access control network. For instance, the trusted mobile device 104 may provide the first credential 112a to a reader of an access control network to access one or more assets protected by the reader.

If the issuance of a guest credential is authorized, the credential issuer 128 may transfer the guest credential to the visitor mobile device 108 via the trusted mobile device 104 and the interaction of the mobile device interfaces 116. The visitor mobile device 108 can then store the guest credential (e.g., as a second credential 112b) in memory of the visitor mobile device 108. Once stored, the guest credential can be used by the visitor mobile device 108 to access one or more assets in an access control network, for example by providing the guest credential to an access control reader.

The credentials 112a, 112b may correspond to access control credentials. In some embodiments, one or both credentials 112a, 112b may be stored in a secure area of memory, such as a Secure Element (SE), Secure Access Module (SAM), Subscriber Identity Module (SIM) card, Integrated Circuit (IC) card, or any other computer memory that is encrypted and/or physically tamper-proof. As a non-limiting example, one or both credentials 112a, 112b may be stored in for use as NFC credentials. In such an example, the credentials 112a, 112b may be stored as an NFC Data Exchange Format (NDEF) record or collection of NDEF records. Specifically, NDEF records are a light-weight binary format, used to encapsulate typed data. NDEF records are specified by the NFC Forum, for transmission and storage with NFC, however, NDEF records are transport agnostic. In some embodiments, an NDEF record may include one or more of: typed data, such as MIME-type media, a URI, or a custom application payload. More specifically, an NDEF record may be configured to contain a 3-bit TNF (Type Name Field) that provides high level typing for the rest of the record. The remaining fields are variable length and not necessarily present: type—detailed typing for the payload; id—identifier meta-data; and/or payload—the actual payload.

Figure 2:
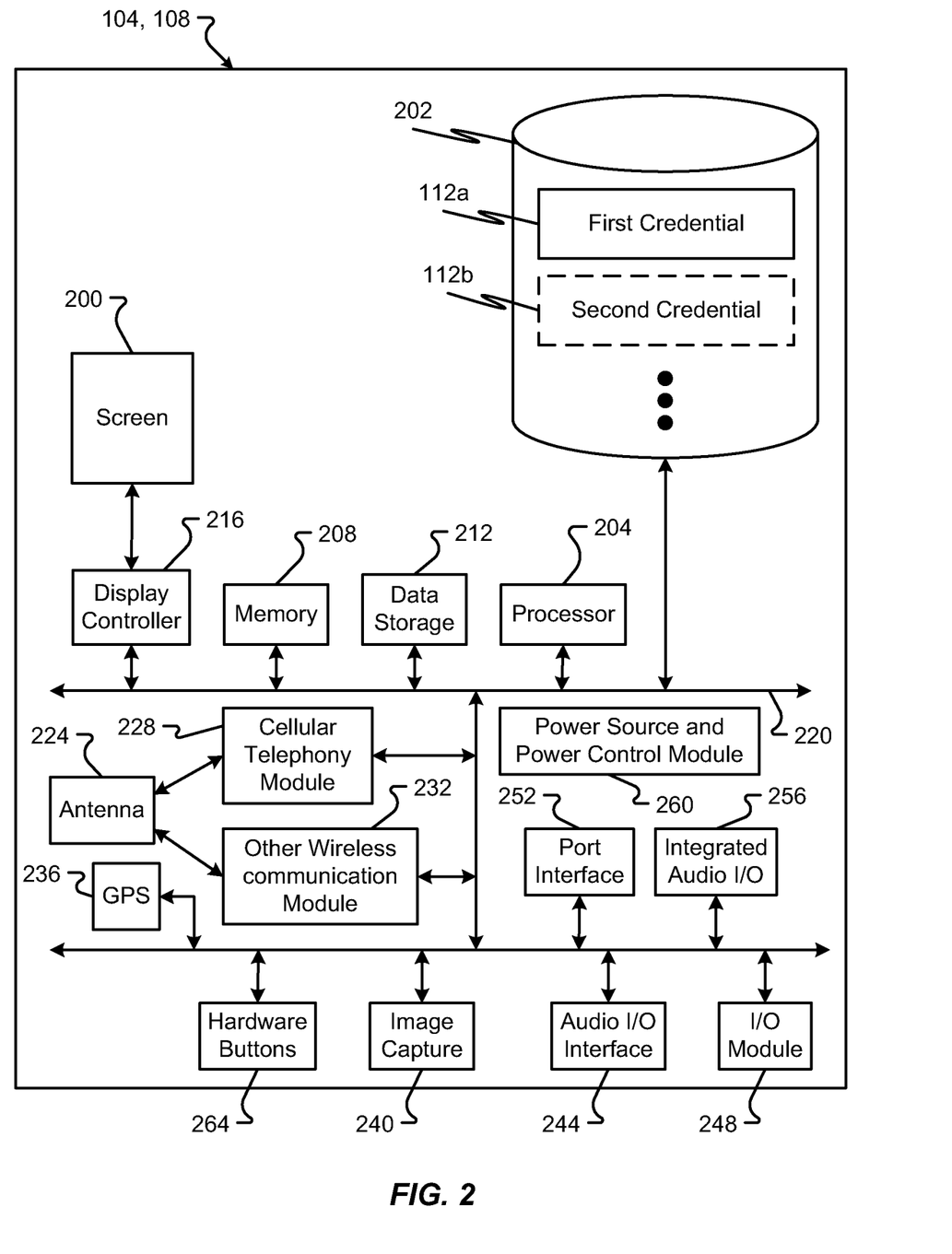
FIG. 2 is a block diagram depicting an embodiment of a mobile device.

With reference now to FIG. 2, additional details of a mobile device 104 (or possibly 108) will be described in accordance with embodiments of the present disclosure. In general, the mobile device 104 includes a screen 200. The screen 200 can be touch sensitive and can include different operative areas. In general, the screen 200 may comprise a full color, touch sensitive display. The screen 200 may comprise a configurable area. The configurable area can be capable of receiving input and has display or limited display capabilities. In embodiments, the configurable area may present different input options to the user. For example, the configurable area may display buttons or other relatable items that allow for the initiation and/or completion of a guest credential creation and transfer process. Moreover, the identity of displayed buttons, or whether any buttons are displayed at all within the configurable area of a screen 200, may be determined from the context in which the device 104 is used and/or operated. In an exemplary embodiment, the screen 200 comprises a liquid crystal display device extending across at least those regions of the screen 200 that are capable of providing visual output to a user, and a capacitive input matrix over those regions of the screen 200 that are capable of receiving input from the user.

A display controller 216 may be provided for controlling the operation of the screen 200, including input (touch sensing) and output (display) functions. In accordance with some embodiments, the functions of a touch screen controller 216 may be incorporated into other components, such as a processor 204.

The processor 204 may comprise a general-purpose programmable processor or controller for executing application programming or instructions. In accordance with at least some embodiments, the processor 204 may include multiple processor cores, and/or implement multiple virtual processors. In accordance with still other embodiments, the processor 204 may include multiple physical processors. As a particular example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to run programming code or instructions implementing various functions of the device 104.

A mobile device 104 may also include memory 208 for use in connection with the execution of application programming or instructions by the processor 204, and for the temporary or long term storage of program instructions and/or data. As examples, the memory 208 may comprise RAM, DRAM, SDRAM, or other solid-state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

In support of communications functions or capabilities, the device 104 can include a cellular telephony module 228. As examples, the cellular telephony module 228 can comprise a GSM, CDMA, FDMA and/or analog cellular telephony transceiver capable of supporting voice, multimedia and/or data transfers over a cellular network. Alternatively or in addition, the device 104 can include an additional or other wireless communications module 232. As examples, the other wireless communications module 232 can comprise a Wi-Fi, BLUETOOTH™, WiMax, infrared, NFC, or other wireless communications link. The cellular telephony module 228 and the other wireless communications module 232 can each be associated with a shared or a dedicated antenna 224.

A port interface 252 may be included. The port interface 252 may include proprietary or universal ports to support the interconnection of the device 104 to other devices or components, such as a dock, which may or may not include additional or different capabilities from those integral to the device 104. In addition to supporting an exchange of communication signals between the device 104 and another device or component, the docking port 136 and/or port interface 252 can support the supply of power to or from the device 104. The port interface 252 also comprises an intelligent element that comprises a docking module for controlling communications or other interactions between the device 104 and a connected device or component.

An input/output module 248 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 244 can be included to provide analog audio to an interconnected speaker or other device, and to receive analog audio input from a connected microphone or other device. As an example, the audio input/output interface/device(s) 244 may comprise an associated amplifier and analog to digital converter. Alternatively or in addition, the device 104 can include an integrated audio input/output device 256 and/or an audio jack for interconnecting an external speaker or microphone. For example, an integrated speaker and an integrated microphone can be provided, to support near talk or speaker phone operations.

Hardware buttons 264 can be included for example for use in connection with certain control operations. Examples include a master power switch, volume control, etc. One or more image capture interfaces/devices 240, such as a camera, can be included for capturing still and/or video images. Alternatively or in addition, an image capture interface/device 240 can include a scanner or code reader. An image capture interface/device 240 can include or be associated with additional elements, such as a flash or other light source.

The device 104 can also include a global positioning system (GPS) receiver 236. In accordance with embodiments of the present invention, the GPS receiver 236 may further comprise a GPS module that is capable of providing absolute location information to other components of the device 104. It may also be possible to require the trusted mobile device 104 to authenticate itself with the credential issuer 128 with location information, which may be obtained from the GPS module 236. Specifically, the credential issuer 128 may require that the trusted mobile device 104 be in a certain location (e.g., a building lobby, a parking lot, a particular room, etc.) before the credential issuer 128 issues a guest credential for a visitor mobile device 108.

Communications between various components of the device 104 can be carried by one or more buses 220. In addition, power can be supplied to the components of the device 108 from a power source and/or power control module 260. The power control module 260 can, for example, include a battery, an AC to DC converter, power control logic, and/or ports for interconnecting the device 108 to an external source of power. The device 104 may also store one or more credentials 112a, 112b in secure memory 202. As discussed above, the secure memory 202 may be similar to memory 208 or data storage 212 except that it is at least one of logically and physically protected from attacks or tamper.

Figure 3:
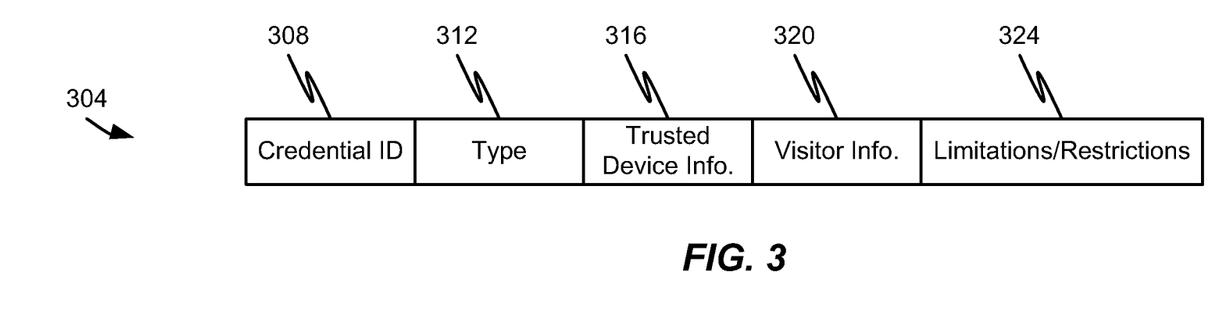
FIG. 3 is a diagram of an embodiment of a data structure used in a trusted communication system.

With reference now to FIG. 3, details of a data structure 304, such as a guest credential, will be described in accordance with embodiments of the present disclosure. The data structure 304 may include one or more data fields that help define a guest credential. Some or all of the data structure 304 may also be used or included in a request for a guest credential that is transmitted from the trusted mobile device 104 to the credential issuer 128. Non-limiting examples of the data fields that may be included in the data structure 304 are a credential identifier field 308, a type field 312, a trusted device information field 316, a visitor information field 320, and a limitations/restrictions field 324.

The credential identifier field 308 may include information that identifies the data structure 304 itself or a device that is allowed to store and/or receive the data structure 304. In some embodiments, the credential identifier field 308 may include information that describes or identifies a guest credential or a non-guest credential used to retrieve a guest credential. The identification information can be a numeric, alphanumeric, globally unique identifier (GUID), or other type of identifier that is unique to this particular guest credential 308. The credential identification information field 308 enables the identification and management of the guest credential. In some embodiments, the credential identification information field 308 may include data that describes an individual or group that is allowed to use the guest credential or an individual or group that vouched for the guest (e.g., a user of the trusted mobile device 104).

A type field 312 may identify a type of guest credential provided to or stored by the visitor mobile device 108. A guest credential can be one or more types. A credential type may describe allowable situations or criteria in which the guest credential is useable. For example, one guest credential may require that the visitor be escorted throughout the facility with a trusted user. Another type of guest credential may provide unlimited access. Still other types of guest credentials may expire after a predetermined amount of time or after a predetermined number of uses. Still other guest credentials may be used for an unlimited time or until revoked. The type of a guest credential, as identified in the type field 312, may be limited based on the identity of the visitor and/or the identity of the user of the trusted device 104 that requested the guest credential. For example, a manger may be able to obtain an "escort only" guest credential.

The data structure 304 may further include a trusted device information field 316. The trusted device information field 316 may describe the trusted mobile device 104 that requested the guest credential and/or a user of the trusted mobile device 104. The trusted device information field 316 may further describe a relationship between the trusted user and visitor.

The data structure 304 is also depicted as including a visitor information field 320. The visitor information field 320 may include information that describes or identifies the visitor, a reason for the visitor's need of a guest credential, an employer of the visitor, and/or a relationship between the visitor and the trusted user.

The data structure 304 may also include a limitations/restrictions field 324. The limitations/restrictions field 324, may include or define any number of limitations and/or restrictions as to how the guest credential may be used. These limitations can include temporal limitations, such as how long a guest credential may be used (or not used); location limitations, such as limitations of physical locations where the guest credential can be used (or not used). The guest credential can have other limitations, which may be based on the trusted user and/or the visitor and the credential type as defined in the type field 312.

Figure 4:
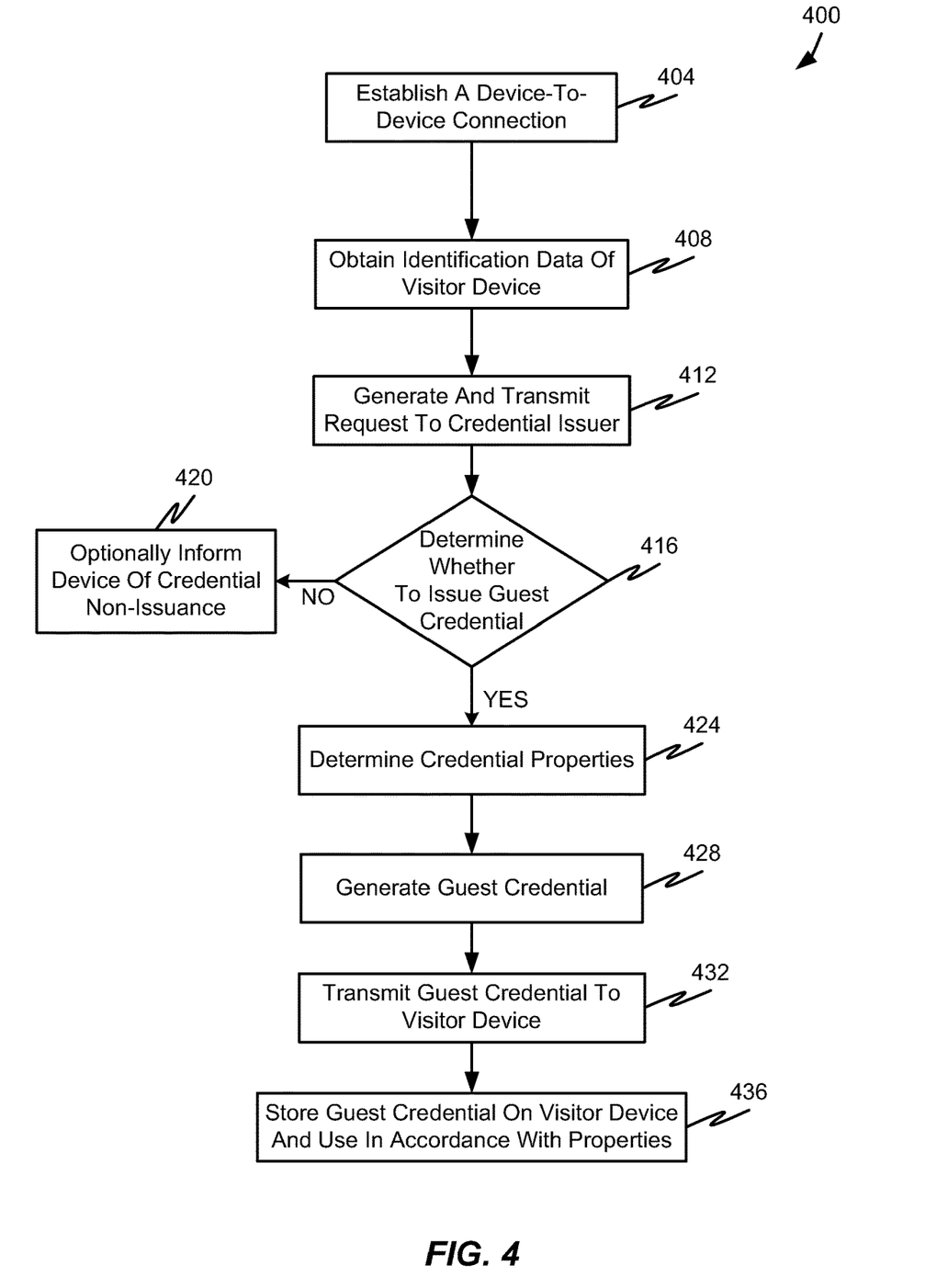
FIG. 4 is a flow diagram depicting an embodiment for generating and distributing guest credentials.

An embodiment of a method 400 for generating and distributing guest credentials will be described. While a general order for the steps of the method 400 is shown in FIG. 4, the method 400 can include more or fewer steps or can arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, user interfaces, etc. described in conjunction with FIGS. 1-3.

The method 400 begins when a connection is established between the two mobile devices 104, 108 (step 404). The connection may be any type of wireless or wired connection using any type of protocol. One non-limiting example of the device-to-device connection that may be established between the mobile devices 104, 108 is an NFC connection. The establishment of the connection may be automated or may be through some user interaction (e.g., selection of a user interface device or by placing the mobile devices 104, 108 within proximity of each other).

The method 400 continues with the trusted mobile device 104 obtaining at least some information describing the visitor mobile device, such as identification data from the visitor mobile device 108 (step 408). This data can enable a unique identification of the visitor mobile device 108, a user of the visitor mobile device 108, or the like for further steps of the process (e.g., UID, device name, IP address, MAC address, etc.). In one embodiment, the request to obtain these data is initiated by the user of the trusted mobile device 104 via the credential request unit 120. The description information (e.g., identification information) may be exchanged via the mobile device interface 116 of the trusted mobile device 104 and may be finally passed to the credential request unit 120.

The credential request unit 120 may then be configured to generate a request for a guest credential and transmit the request to the credential issuer 128 (step 412) via the communication network 124. This generation and transmission of a request is considered to be on behalf of the visitor mobile device 108 and, in some embodiments, the request may contain some or all of the information obtained by the trusted mobile device 104 from the visitor mobile device 108 (e.g., the information describing the visitor mobile device 108).

The trusted mobile device 104 may also include information in the request that proves the identity of the trusted mobile device 104 and/or its user to the credential issuer 128. In particular, the trusted mobile device 104 may provide the credential issuer 128 with information describing the trusted mobile device 104 (e.g., device name, IP address, MAC address, etc.), information proving that the trusted mobile device 104 knows a predetermined secret (e.g., a password, key, hash, etc.), information proving the trusted mobile device 104 is being carried by a trusted user (e.g., biometric information, a user-entered PIN, a image recently captured of the user, an audio input, etc.), and/or information proving the trusted device 104 is in an appropriate or predetermined location (e.g., location information from the GPS module 236, location information obtained from Wi-Fi location, cellular location information, images of surroundings, etc.).

The method 400 continues with the credential issuer 128 receiving the request for a guest credential from the trusted mobile device 104 and analyzing the request to determine whether or not to issue a guest credential (step 416). This determination may be based solely on an analysis of the information contained in the received request. This determination may also consider other information. For instance, the credential issuer 128 may only be allowed to issue a predetermined number of guest credentials at a given time or have a predetermined number of guest credentials outstanding. If the predetermined number of guest credentials are already issued or still active, then the credential issuer 128 may determine not to issue the guest credential. The credential issuer 128 may alternatively or additionally analyze information about the trusted mobile device 104 to determine if the request is valid. The credential issuer 128 may alternatively or additionally analyze information about the visitor mobile device 108 to determine if the visitor mobile device 108 is on a blacklist or whitelist.

If the query of step 416 is answered negatively, then the credential issuer 128 will not issue a guest credential and may optionally inform the trusted mobile device 104 of the decision not to issue a guest credential (step 420). The credential issuer 128 may also inform the trusted mobile device 104 as to why the guest credential was not issued. An activity log may also be updated by the credential issuer 128 to indicate that the request for a guest credential was received and denied along with any other information deemed appropriate to store. Optionally if for example data are missing (not shown in FIG. 4), the credential issuer 128 may ask for additional information to/through the credential request unit 120 in order to complete the credential request.

If, however, the query of step 416 is answered positively, then the credential issuer 128 will determine the properties of the guest credential (step 424), generate the guest credential to have the determined properties (step 428), and transmit the guest credential to the visitor mobile device 108 (step 432). In some embodiments, the guest credential may be generated to have one or more use restrictions. This information can be stored with the guest credential as described in connection with FIG. 3.

The transmission of the guest credential to the visitor mobile device 108 may be made with the assistance of the trusted mobile device 104. In the preferred embodiment this exchange is performed with the trusted mobile device 104 acting in a transparent NFC writing mode i.e. without any active action of the trusted mobile device 104 in the transmission process or on the transmitted data. In such cases, the credential issuer unit can just send a message to the credential request unit 120 in order to notify the user of the trusted mobile device 104 that the guest credential has been delivered. Alternatively and if requested for security reason for example, the guest credential may be received at the credential request unit 120 first and passed only then to the visitor mobile device 108 (under action or not from the user of trusted mobile device 104). Of course, protocols other than NFC can be used to transfer the guest credential to the visitor mobile device 108. It may also be possible for the credential issuer 128 to transmit the guest credential to the visitor mobile device 108 without the assistance of the trusted mobile device 104. For example, the credential issuer 128 may transmit one or more messages (e.g., SMS message, MMS message, email message, etc.) that contain the guest credential to the visitor mobile device. In such an embodiment, the credential issuer 128 may transmit the message(s) to the visitor mobile device 108 via communication network 124 without traversing the trusted mobile device 104.

Once received at the visitor mobile device 108, the guest credential is stored (e.g., as a second credential 112*b*) so that the visitor mobile device 108 is allowed to use the guest credential (step 436). As can be appreciated, use of the guest credential may be limited by restrictions placed on the guest credential when it was created by the credential issuer 128.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   establishing a device-to-device connection between a trusted mobile device and a visitor mobile device and during the device-to-device connection, receiving, at the trusted mobile device, at least some information describing the visitor mobile device;
   generating at the trusted mobile device a request for a guest credential to be issued to the visitor mobile device, the request containing the at least some information describing the visitor mobile device and sending said request to a credential issuer;
   analyzing the request generated by the credential issuer to determine that the trusted mobile device is allowed to provision the visitor mobile device with the guest credential; and
   based on the analysis of the request, generating the guest credential, wherein the guest credential is transmittable to, and storable in memory of, the visitor mobile device and is configured for transmission by the visitor mobile device to a physical access control reader that protects a physical asset, thereby enabling a user of the visitor mobile device to access the physical asset.

2. The method of claim 1, further comprising:
   storing the guest credential in the memory of the visitor mobile device as one or more Near Field Communications (NFC) Data Exchange Format (NDEF) records.

3. The method of claim 2, further comprising:
   transmitting the guest credential to the visitor mobile device.

4. The method of claim 3, wherein the guest credential is transmitted to the visitor mobile device via the trusted mobile device.

5. The method of claim 4, wherein the trusted mobile device writes the guest credential to the visitor mobile device using Near Field Communications.

6. The method of claim 4, wherein the trusted mobile device writes the guest credential to the visitor mobile device using Bluetooth.

7. The method of claim 2, further comprising:
   determining that one or more limitations of use are to be placed on the guest credential; and
   incorporating the one or more limitations of use in the generated guest credential.

8. The method of claim 7, wherein the one or more limitations include an escort restriction.

9. The method of claim 2, wherein determining that the trusted mobile device is allowed to provision the visitor mobile device with the guest credential comprises analyzing information about at least one of the trusted mobile device and a user of the trusted mobile device.

10. The method of claim 9, wherein a location of the trusted mobile device is used to determine whether the trusted mobile device is allowed to provision the visitor mobile device with the guest credential.

11. The method of claim 9, wherein a credential provided by the trusted mobile device is analyzed to determine whether the trusted mobile device is allowed to provision the visitor mobile device with the guest credential.

12. A mobile device, comprising:
    a mobile device interface enabling the mobile device to establish a device-to-device connection with a visitor mobile device and receive at least some information describing the visitor mobile device; and
    a credential request unit that generates and sends a request for the guest credential to a credential issuer on behalf of the visitor mobile device, the request containing the at least some information describing the visitor mobile device, wherein the guest credential is storable in memory of the visitor mobile device and is configured for transmission by the visitor mobile device to an access control reader that protects a physical asset.

13. The mobile device of claim 12, wherein the credential request unit is further configured to receive the guest credential from the credential issuer and provide the guest credential to the mobile device interface for writing to the visitor mobile device.

14. The mobile device of claim 12, wherein the mobile device interface comprises a Near Field Communications interface.

15. The mobile device of claim 14, wherein the Near Field Communications interface is configured to write the guest credential to the visitor mobile device in a transparent writing mode.

* * * * *